(12) United States Patent
Nakajima et al.

(10) Patent No.: US 8,799,342 B2
(45) Date of Patent: Aug. 5, 2014

(54) SIGNAL PROCESSING DEVICE

(75) Inventors: Hirofumi Nakajima, Wako (JP);
Kazuhiro Nakadai, Wako (JP); Yuji Hasegawa, Wako (JP); Hiroshi Tsujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1703 days.

(21) Appl. No.: 12/198,488

(22) Filed: Aug. 26, 2008

(65) Prior Publication Data

US 2009/0063605 A1 Mar. 5, 2009

Related U.S. Application Data

(60) Provisional application No. 60/968,444, filed on Aug. 28, 2007.

(30) Foreign Application Priority Data

Jul. 14, 2008 (JP) .................................. 2008-182616

(51) Int. Cl.
*G06F 17/15* (2006.01)

(52) U.S. Cl.
CPC .................................... *G06F 17/15* (2013.01)
USPC ....... 708/422; 375/240.16; 700/245; 700/249

(58) Field of Classification Search
USPC .......................................................... 708/422
See application file for complete search history.

(56) References Cited

U.S. PATENT DOCUMENTS

| | | | |
|---|---|---|---|
| 6,377,213 B1* | 4/2002 | Odachi et al. ................. 342/383 |
| 6,642,888 B2* | 11/2003 | Kishigami et al. ............ 342/417 |
| 7,031,719 B2* | 4/2006 | Miyano et al. ............. 455/452.1 |
| 7,076,433 B2* | 7/2006 | Ito et al. ......................... 704/500 |
| 7,379,020 B2* | 5/2008 | Tsuchihashi et al. .......... 342/417 |
| 8,050,141 B1* | 11/2011 | Carroll et al. ................. 367/124 |
| 8,380,150 B2* | 2/2013 | Aoyama ..................... 455/226.4 |
| 2004/0202243 A1* | 10/2004 | Lin et al. ....................... 375/227 |
| 2005/0013369 A1* | 1/2005 | Lee ........................... 375/240.16 |
| 2005/0101264 A1* | 5/2005 | Farlow et al. .................... 455/84 |
| 2006/0136402 A1* | 6/2006 | Lee ..................................... 707/3 |
| 2006/0208947 A1* | 9/2006 | Tsuchihashi et al. .......... 342/417 |
| 2008/0005048 A1* | 1/2008 | Weng .............................. 706/14 |

FOREIGN PATENT DOCUMENTS

JP  2003-318792  11/2003

OTHER PUBLICATIONS

Adaptive Signal Processing with Array Antenna, Published by: Kagaku Gjjutsu Shuppan Inc., Date of Publishation: Nov. 25, 1998, English abstract included.

(Continued)

*Primary Examiner* — Shyue Jiunn Hwa

(74) *Attorney, Agent, or Firm* — Rankin, Hill & Clark LLP

(57) ABSTRACT

A device capable of improving the convergence rate and estimation accuracy in estimating a correlation value. According to a signal processing device, since a window length is adjusted in such a manner to reduce an estimated error of a correlation matrix, the convergence rate and estimation accuracy in estimating the correlation matrix and the correlation value as its off-diagonal element can be improved. Then, in such a high-probability condition that the correlation of plural output signals according to a state is estimated with a high degree of precision, signal processing is performed on the plural signals, so that the state can be estimated with a high degree of precision.

3 Claims, 10 Drawing Sheets

(56) References Cited

OTHER PUBLICATIONS

Blind Source Separation Based on a Fast-Convergence Algorithm Combining ICA and Beamforming, Hiroshi Saruwatari et al., IEEE Transactions on Audio, Speech, and Language Processing, vol. 14, No. 2, Mar. 2006, (English text).

High performance blind source separation using an adaptive step-size parameter method, Hirofumi Nakajima et al., IEICE Technical Report EA2007-30 (Jun. 2007), (English abstract).

Speech enhancement for non-stationary noise environments, Israel Cohen et al., Signal Processing 81 (2001) 2403-2418, (English text).

* cited by examiner

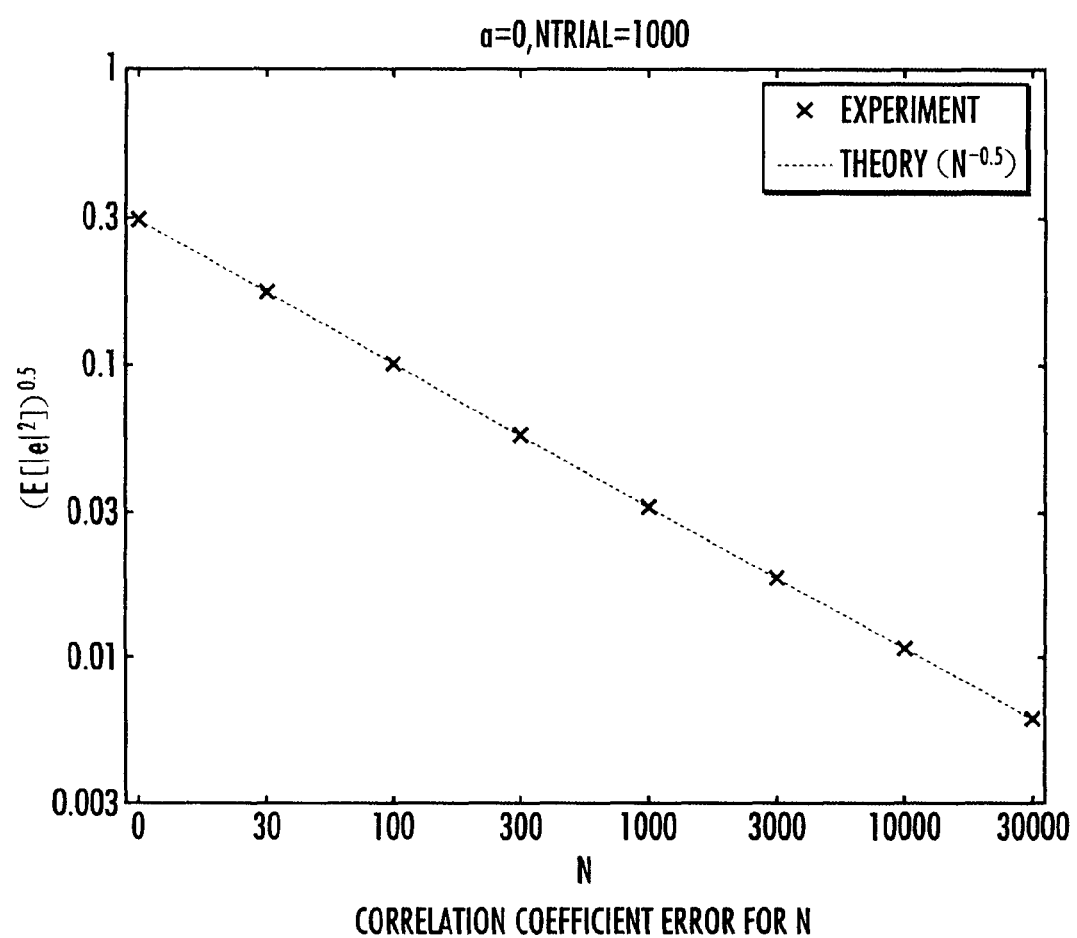

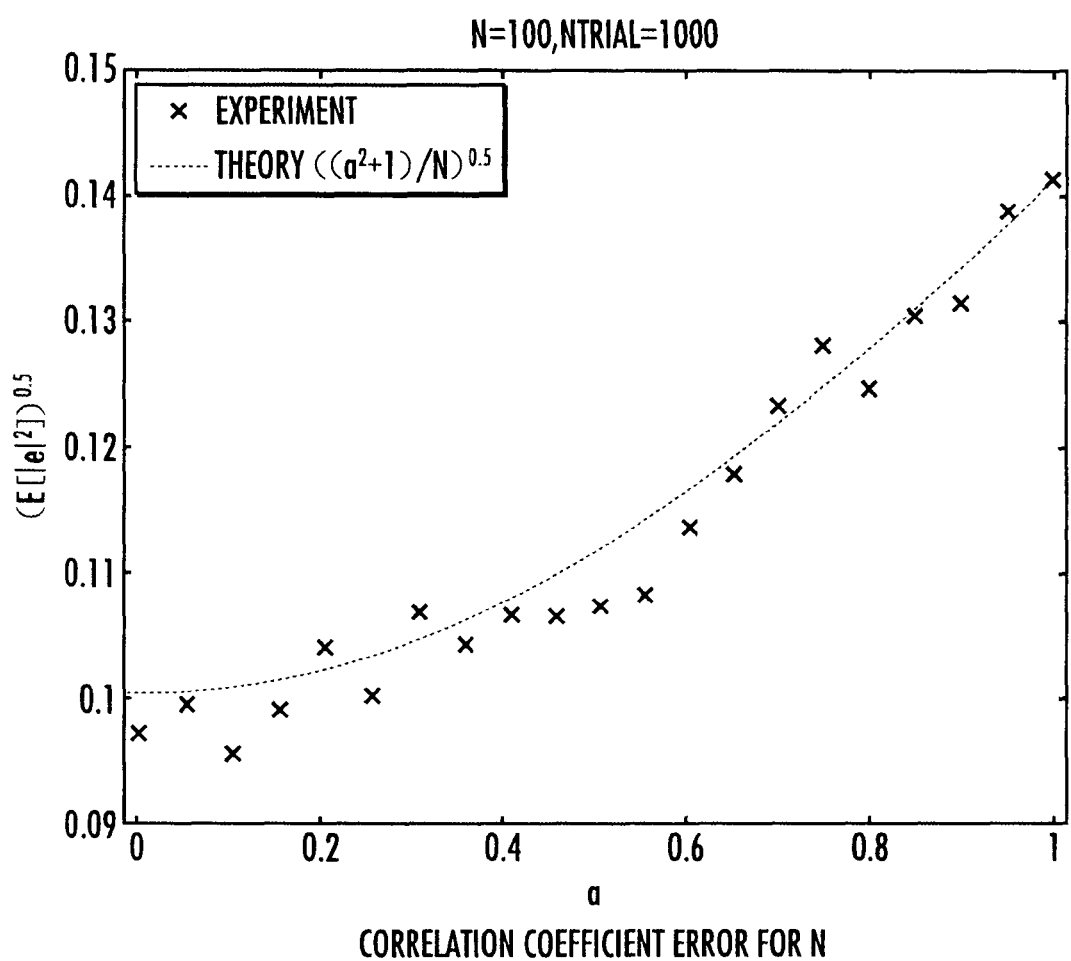

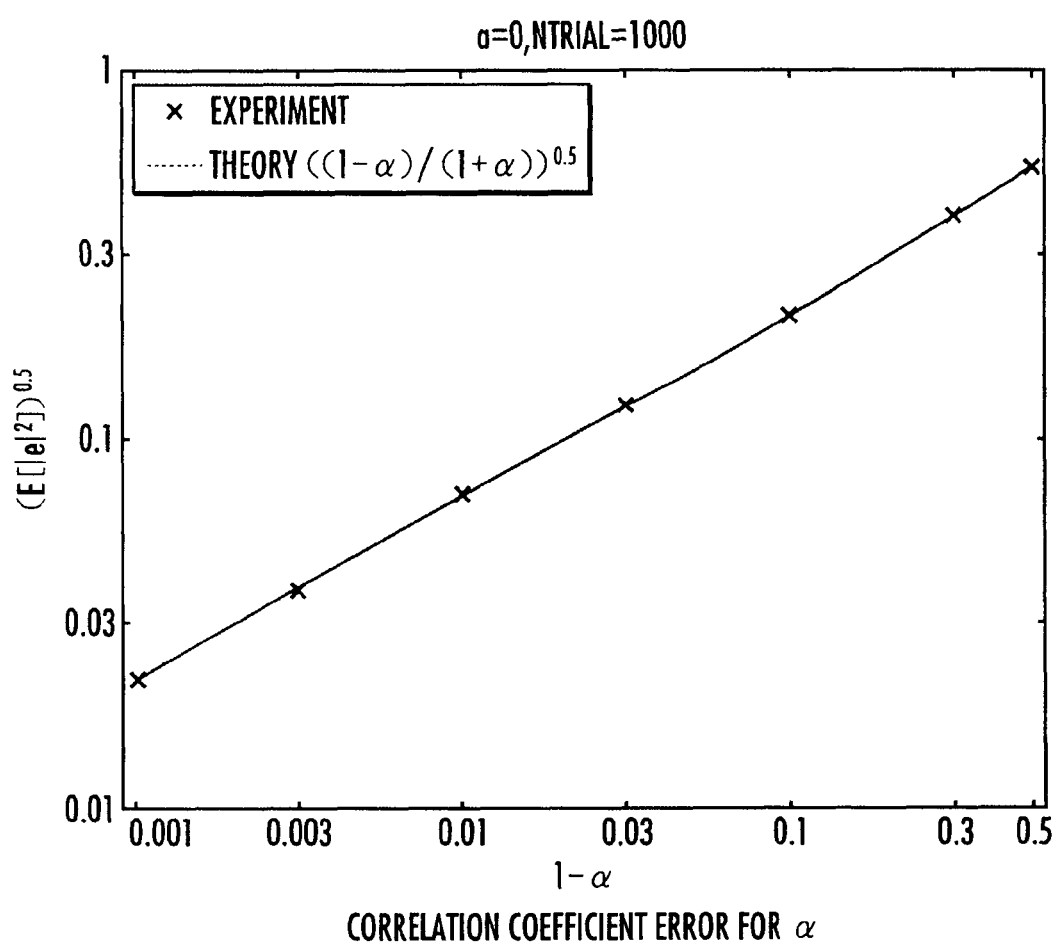

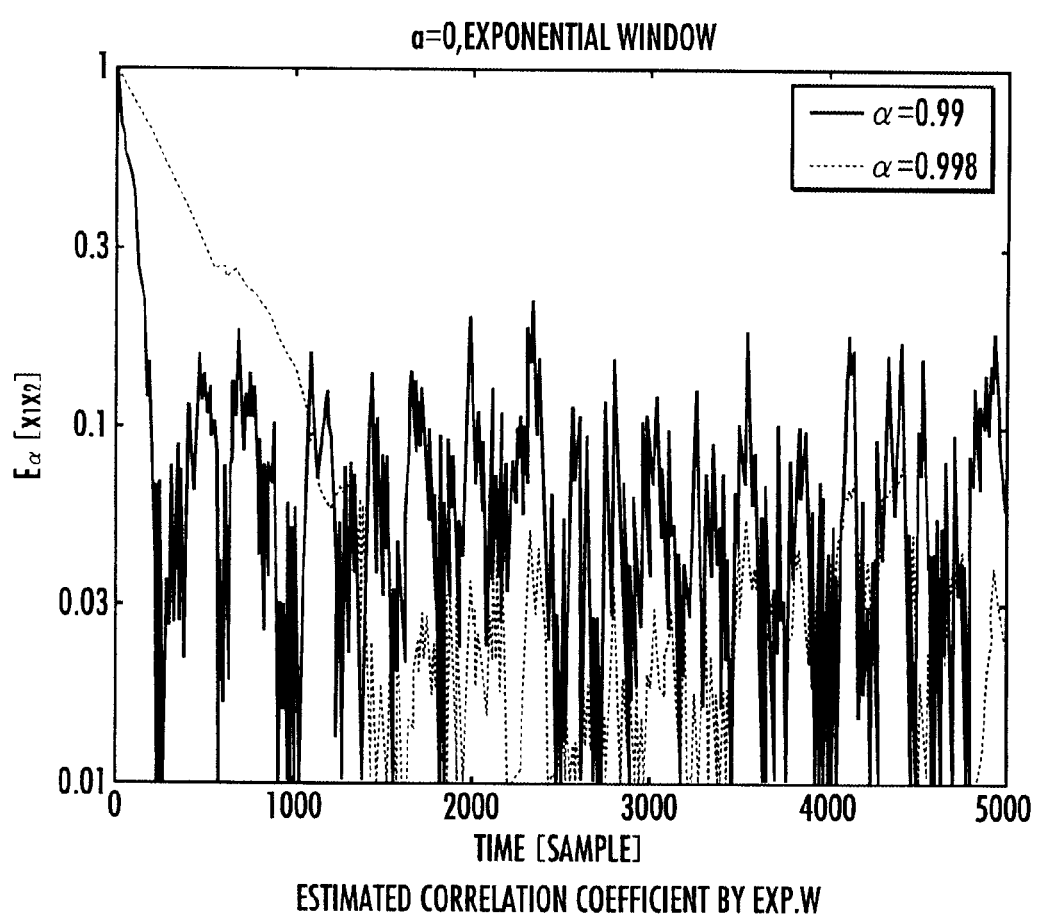

SIGNAL PROCESSING DEVICE

BACKGROUND OF THE INVENTION

1. Field of the Invention

The present invention relates to a signal processing device for estimating a correlation matrix in such a manner to adapt to input signals.

2. Description of the Related Art

Correlation matrix estimation is used for MUSIC, BF (BeamFormer), or BSS (Blind Source Separation) (see N. Kikuma, Adaptive Signal Processing with Array Antenna, Kagaku Gijutsu Shuppan, Inc., 1999, and H. Saruwatari et al., IEEE Trans. on Speech and Audio Process, vol. 14(2), pp. 666-678, 2006). The correlation matrix $R_{xx}$ is defined by Equation (1) for signal x(t) represented as an Nth-dimensional column vector using discrete time t as a variable.

$$R_{xx} = E[x(t)x^H(t)], \quad (1)$$

where H denotes a complex conjugate transposed matrix, and E(A(t)) represents an expected value or time average for A(t). Since Equation (1) includes the expected value operation, the calculation of the correlation matrix requires that the signal x(t) be known at all times t.

However, since the adaptive BF or adaptive BSS cannot use future signals and the signal varies over time, signals acquired up to the time of buffering are used to estimate the correlation matrix. Specifically, an estimated correlation matrix $\hat{R}_{xx}(t)$ at time t is calculated using a window function w(t) for signal extraction according to Equation (2).

$$\hat{R}_{xx}(t) = w(t) * [x(t)x^H(t)] \quad (2)$$
$$= \sum_\tau w(\tau) \cdot [x(t-\tau)x^H(t-\tau)],$$

where * represents convolution. In the actual processing, a rectangular window having a certain length is often used as the window function w(t). In order to reduce the amount of calculation, a technique for calculating a spaced, estimated correlation matrix $\hat{R}_{xx}(t)$ and a technique using calculated values based on only data in the current time have been proposed (see J. M. Valin et al., Proc. IEEE/RSJ Intelligent Robot and Systems, pp. 2123-2128, 2004, and Nakajima et al., Technical Report of IEICE, Vol. EA2007-30, pp. 19-24, 2007).

The accuracy of correlation matrix estimation varies depending on the kind of window. Here, two signals $x_1(t)$ and $x_2(t)$ are considered, which are respectively defined by Equations (3) and (4) in which the correlation value r is a ($|a| \leq 1$). For the sake of simplicity, signal power is normalized.

$$x_1(t) = n_1(t), \quad (3)$$

$$x_2(t) = an_1(t) + (1-a^2)^{1/2} n_2(t), \quad (4)$$

where $n_1(t)$ and $n_2(t)$ represent noise signals that follow the standard normal distribution. If the expected value operation using a rectangular window having length N is defined by Equation (5), the estimated correlation value $\hat{r}$ of the two signals is calculated according to Equation (7).

$$E_N[u(t)] = (1/N)\Sigma_{t=0..N-1} u(t) \quad (5)$$

$$\hat{r} = E_N[x_1(t)x_2(t)] \quad (7)$$
$$= aE_N[n_1^2(t)] + (1-a^2)^{1/2} E_N[n_1(t)n_2(t)]$$

As N approaches infinity, since $E_N[n_1^2(t)]$ approaches 1 whereas $E_N[n_1(t)n_2(t)]$ approaches 0, the estimated correlation value $\hat{r}$ substantially matches a true value. However, if N is finite, an error e expressed by Equation (8) occurs.

$$e = \hat{r} - r \quad (8)$$
$$= a(E_N[n_1^2(t)] - 1) + (1-a^2)^{1/2} E_N[n_1(t)n_2(t)]$$

$E_N[n_1^2(t)]$ follows the chi-square distribution $\chi_N^2$ with a N degrees of freedom, and its mean is 1 and the dispersion is 2/N. $E_N[n_1(t)n_2(t)]$ follows the product of normal distribution, and it is estimated that its mean is 0 and the dispersion is 1/N. It shows that the average power $E[e^2]$ of the estimated error of the correlation value is inversely proportional to N as expressed in Equation (9).

$$E[e^2] = (a^2+1)/N \quad (9)$$

FIG. 7 illustrates the calculation results of RMS (Root Mean Square) error values when uncorrelated signals are estimated using the rectangular window. The experimental values (indicated by the x marks) were calculated from the trials of 1000 times based on random numbers that follow two independent Gaussian distributions. The theoretical values (indicated by the dotted line) were set to $1/N^{1/2}$. It is apparent from FIG. 7 that the theoretical values and the experimental values match each other. The correlation value of the signals does not become 0 even if the signals are uncorrelated signals, and the RMS values are proportional to $N^{-1/2}$. FIG. 8 illustrates RMS error values when the correlation value a has varied on condition that the window length N was fixed to 1000. It is apparent from FIG. 8 that the error increases as the correlation value a becomes large. Note that although the real signals were treated in this analysis, the same analysis can be applied to a correlation value $E_N[z_1^*(t)z_2(t)]$ of complex signals $z_1(t)$ and $z_2(t)$, in each of which the real part and the imaginary part of the values follow the independent Gaussian distributions, to show that the error average power is proportional to $N^{-1/2}$. In this case, however, since the dispersion of $E_N[|n_1(t)|^2]$ becomes 1/N, the error average power becomes constant regardless of the correlation value a.

When a correlation value is estimated for input signals discretely or continuously, an exponential window exhibits better effects than the rectangular window in terms of the amount of storage and the amount of calculation. The exponential window is often used for signal power estimation (see I. Kohen and B. Berdugo, Signal Processing, Vol. 81, 2001, pp. 2403-2418, 2001). On the other hand, there are fewer reports for correlation matrix estimation.

The following describes the fact that the estimation accuracy of the estimate value depends on the area of a squared window. When the expected value operation using an exponential window with attenuation factor $\alpha$ ($0<\alpha<1$) is defined by Equation (10), the estimate values using the window are recursively calculated according to Equation (11).

$$E_\alpha[u(t)] = (1-\alpha)\Sigma_\tau u(t-\tau)\alpha^\tau \quad (10)$$

$$E_\alpha[u(t)] = \alpha E_\alpha[u(t-1)] + (1-\alpha)u(t) \quad (11)$$

The dispersion of signals averaged with the window w(t) is $\Sigma_t w_t^2$ times the dispersion of signals that are not averaged, i.e., it becomes double the area. Therefore, the average power of the estimated error of the correlation value using the exponential window is estimated by Equation (12).

$$E[e^2] = (a^2 + 1)\sum_{\tau}[(1-\alpha)\alpha^{\tau}]^2 \qquad (12)$$
$$= (a^2+1)(1-\alpha)/(1+\alpha)$$

It is found from Equations (9) and (12) that the estimated error with the exponential window having the attenuation factor $\alpha$ matches the error with a rectangular window having a window length $N=(1+\alpha)/(1-\alpha)$. FIG. 9 illustrates the calculation result of the standard deviation of errors for the attenuation factor $\alpha$ of the window. The abscissa represents logarithmic values of $1-\alpha$. It is apparent from FIG. 9 that the theoretical values match the experimental values, and that the standard deviation of the estimated error of the correlation value with the exponential window matches the standard deviation of the estimated error of the correlation value with the rectangular window as the squared window having the same area.

However, since the estimation accuracy of the correlation value depends on the area of the squared window, the estimation accuracy of the correlation value is higher as the window length is longer, but it reduces the tracking of variations in sequential processing. FIG. 10 illustrates the results of sequentially estimating a correlation value of two uncorrelated signals with an exponential window. The abscissa represents time, the ordinate represents correlation values, and the line types represent differences in attenuation factor $\alpha$ of the exponential window. It is apparent from FIG. 10 that in the case that the window is long (in case of $\alpha=0.998$), the absence of correlation can be detected with a high degree of precision but the convergence time becomes long compared to the case that the window is short (in case of $\alpha=0.99$).

Therefore, it is an object of the present invention to provide a device capable of improving the convergence rate and estimation accuracy in estimating a correlation value.

SUMMARY OF THE INVENTION

A signal processing device of the first invention comprises a state detection unit which outputs plural signals according to a state, a correlation calculation unit which calculates a correlation matrix of plural output signals from the state detection unit, and a correlation estimation unit which smoothens the correlation matrix calculated by the correlation calculation unit to determine an estimated correlation matrix. The signal processing device further comprises an estimated error evaluation unit which evaluates an estimated error based on the estimated correlation matrix determined by the correlation estimation unit and a window length adjusting unit which adjusts a window length as the length of the window function in such a manner to reduce the estimated error evaluated by the estimated error evaluation unit.

According to the signal processing device of the first invention, since the window length is adjusted to reduce the estimated error in the correlation matrix, the convergence rate and estimation accuracy in estimating the correlation matrix and the correlation value as its off-diagonal element can be improved.

A signal processing device of the second invention is based on the signal processing device of the first invention. The correlation estimation unit determines the estimated correlation matrix according to an exponential window as the window function. The window length adjusting unit adjusts the window length $\alpha(t)$ according to the following equations (C1) and (C2) based on an allowable error rate $\beta$, an estimated correlation value $\hat{r}(t)$ as an off-diagonal element of the estimated correlation matrix at time t, and an upper value $N_{max}$ of the window length equivalent to that of a rectangular window having the window length:

$$N\tilde{}(t)=\min[1/(\beta\hat{r}(t))^2, N_{max}], \qquad (C1)$$

$$\alpha(t)=(N\tilde{}(t)-1)/(N\tilde{}(t)+1). \qquad (C2)$$

According to the signal processing device of the second invention, since the window length of the exponential window is adjusted to reduce the estimated error in the correlation matrix, the convergence rate and estimation accuracy in estimating the correlation value as the off-diagonal element of the correlation matrix can be improved. Further, it can be prevented that the window length exceeds the threshold $N_{max}$ when the correlation estimate value $\hat{r}(t)$ approaches 0 due to an error or the like.

A signal processing device of the third invention is based on the signal processing device of the first or second invention, further comprising a state estimation unit which estimates the state by performing signal processing on the plural output signals according to the estimated correlation matrix when the estimated error has become a predetermined value after the window length adjusting unit adjusted the window length in such a manner that the estimated error would be equal to or less than the predetermined value.

According to the signal processing device of the third invention, in such a high-probability condition that the correlation of plural output signals according to the state is estimated with a high degree of precision, signal processing is performed on the plural signals, so that the state can be estimated with a high degree of precision.

BRIEF DESCRIPTION OF THE DRAWINGS

FIG. 7 is a graph for explaining RMS error values in estimating uncorrelated signals using a rectangular window having length N.

FIG. 8 is a graph for explaining RMS error values when the window length N is fixed to 1000 and correlation values a are changed.

FIG. 9 is a graph for explaining standard deviation values of error for attenuation factor $\alpha$ of an exponential window.

FIG. 10 is a graph for explaining the results of estimation of a correlation value of two uncorrelated signals with the exponential window.

DESCRIPTION OF THE PREFERRED EMBODIMENT

Figure 1:
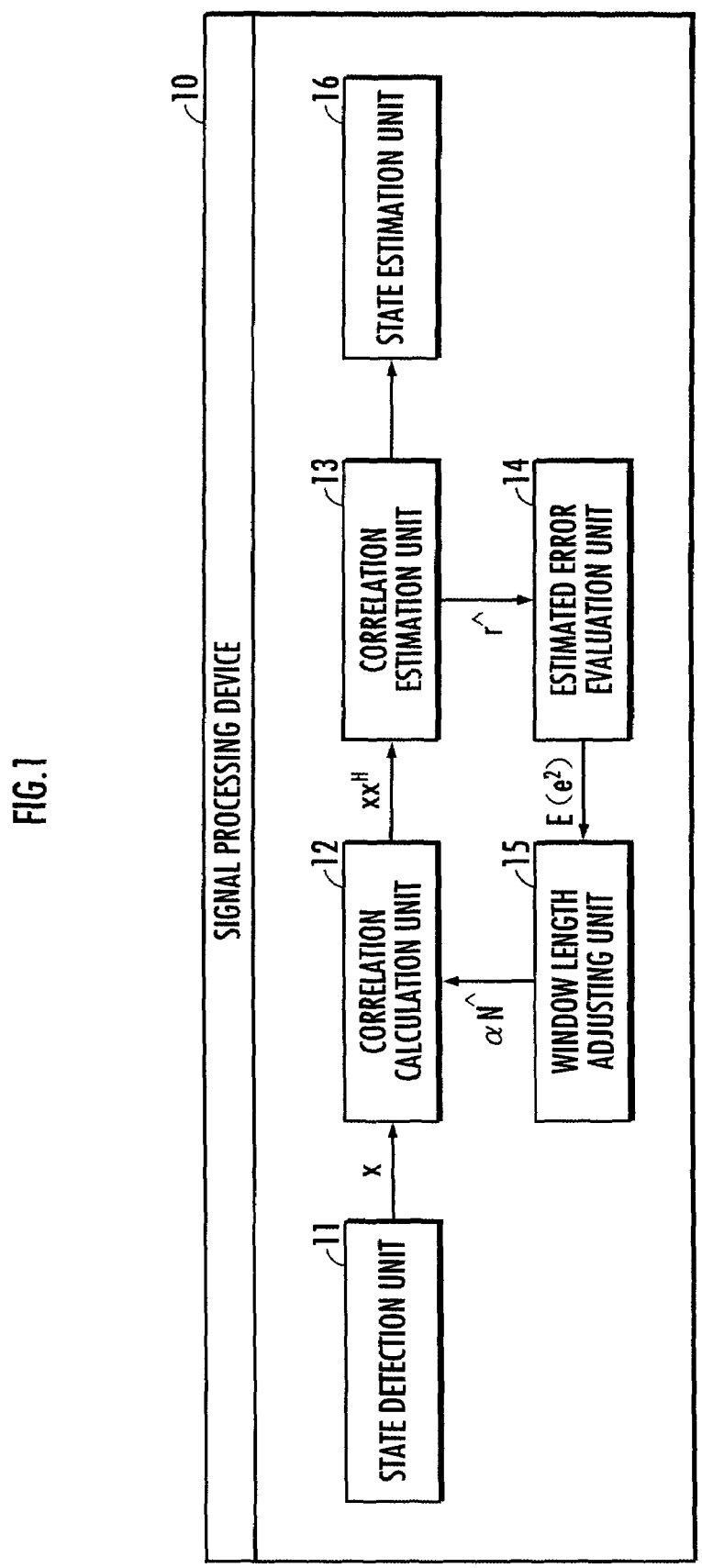
FIG. 1 is a schematic diagram of a signal processing device of the present invention.

An embodiment of a signal processing device of the present invention will now be described with reference to the accompanying drawings. The technique of the present invention is called an OCRA (Optimum Controlled Recursive Average) method below. A signal processing device 10 shown in FIG. 1 is constructed to include an electronic control unit (consisting of electronic circuits and the like, such as a CPU, a ROM, a RAM, an I/O circuit, and an ND conversion circuit). The signal processing device 10 includes a state detection unit 11 (i.e., a state detection processor), a correlation calculation unit 12 (i.e., a correlation calculation processor), a correlation estimation unit 13 (i.e., a correlation estimation processor), an estimated error evaluation unit 14 (i.e., an estimated error evaluation processor), a window length adjusting unit 15 (i.e., a window length adjusting processor), and a state estimation unit 16 (i.e., a state estimation processor). Each component unit of the signal processing device 10 is constructed of arithmetic circuits, or of a memory and an arithmetic processing device for reading a program from the memory and performing arithmetic processing according to the program. The state detection unit 11 outputs signals according to a state. The correlation calculation unit 12 calculates a correlation matrix of the output signals from the state detection unit 11. The correlation estimation unit 13 smoothes the correlation matrix calculated by the correlation calculation unit 12 according to a window function to determine an estimated correlation matrix. The estimated error evaluation unit 14 evaluates an estimated error based on the estimated correlation matrix calculated by the correlation estimation unit 13. The window length adjusting part 15 adjusts a window length (the length of the window function) in such a manner to reduce the estimated error evaluated by the estimated error evaluation unit 14. The state estimation unit 16 performs signal processing on plural output signals according to the estimated correlation matrix, of which the estimated error has become equal to or less than a predetermined value, to estimate the state.

The following describes the functions of the signal processing device 10 having the above-mentioned structure. First, an exponent k indicating discrete time t is set to "1" (S001 in FIG. 2). Then, signals are input from respective microphones $M_i$ to the state detection unit 11. The state detection unit 11 performs A/D conversion on the input signals, and outputs the obtained signals $x(k)=^T(x_1(k), \ldots, x_n(k))$ (S002 in FIG. 2). Further, the correlation calculation unit 12 calculates the correlation matrix $R(k)=x(k)x^H(k)$ according to the above-mentioned Equation (1) based on the output signals $x(k)$ from the state detection unit 11 (S004 in FIG. 2).

Figure 2:
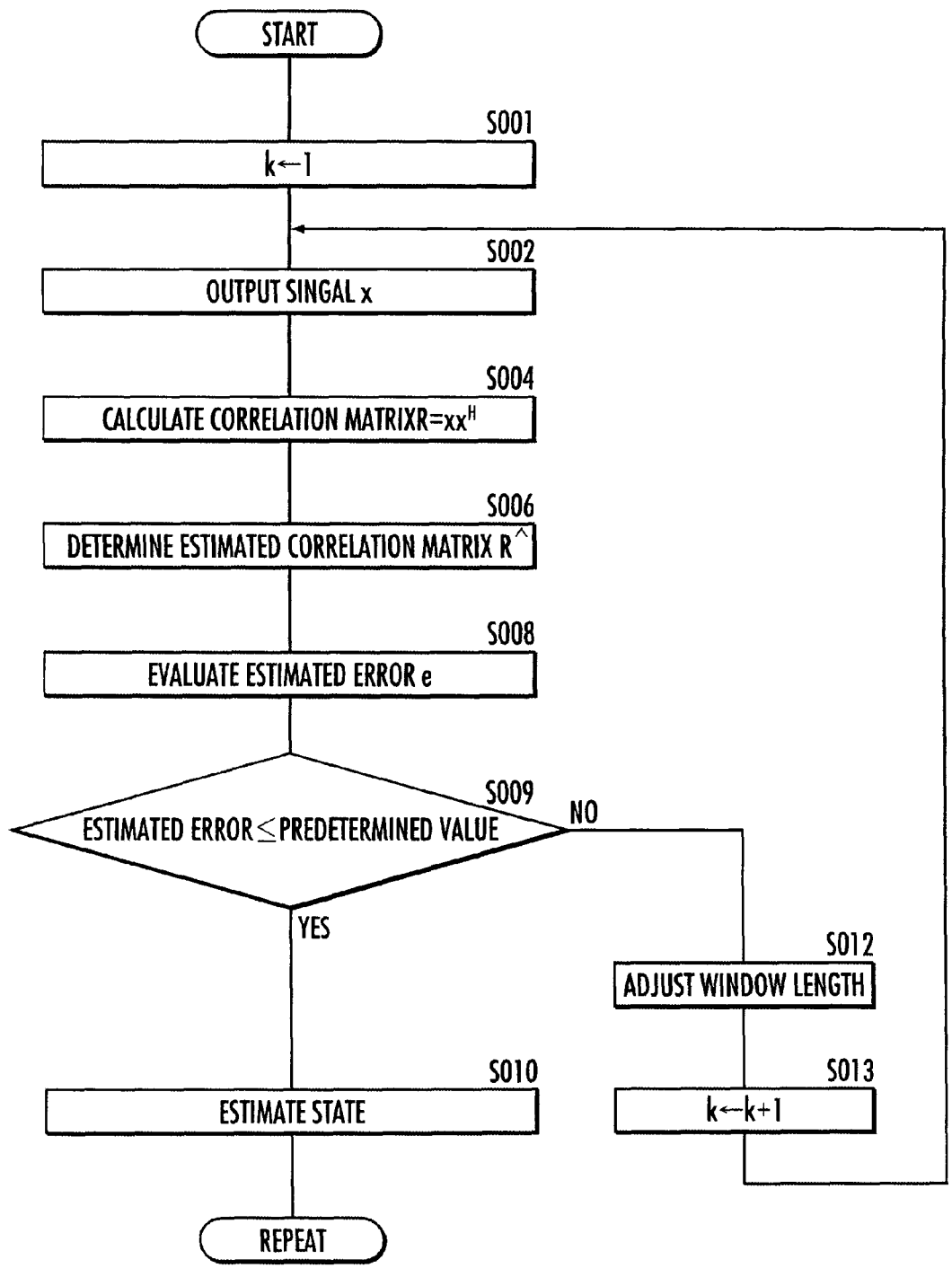
FIG. 2 is a flowchart illustrating the functions of the signal processing device of the present invention.

The correlation estimation unit 13 smoothes the correlation matrix $x(k)x^H(k)$ calculated by the correlation calculation unit 12 according to the exponential window as the window function $w(k)$ to determine the estimated correlation matrix $\hat{R}(k)$ according to the above-mentioned Equation (2) (S006 in FIG. 2). Note that any of the window functions other than the exponential window can also be used as the window function $w(k)$, such as rectangular window, Gauss window, Hann window, Hamming window, Blackman window, Kaiser window, Bartlett window, etc.

The estimated error evaluation unit 14 evaluates the estimated error $e(k)$ based on the estimated correlation matrix $\hat{R}(k)$ calculated by the correlation estimation unit 13 (S008 in FIG. 2). Specifically, the average power $E(e^2)$ of the estimated error $e(k)$ is calculated according to the above-mentioned Equations (10) to (12).

Then, the window length adjusting unit 15 determines whether the estimated error (precisely, its average power) is equal to or less than a predetermined value (S009 in FIG. 2). If it is determined that the estimated error is equal to or less than the predetermined value (YES in S009), the state estimation unit 16 performs signal processing on the plural output signals x according to the estimated correlation matrix $\hat{R}(k)$ to estimate a state represented by the plural output signals x (S010 in FIG. 2). Specifically, sound source separation to be described later is performed.

On the other hand, if it is determined that the estimated error is more than the predetermined value (NO in S009), the window length adjusting unit 15 adjusts the window length in such a manner to reduce the estimated error evaluated by the estimation error evaluation part 14 (S012 in FIG. 2). Specifically, the window length $\alpha(t)$ of the exponential window is adjusted according to Equations (C1) and (C2) based on an allowable error rate $\beta$, an estimated correlation value $\hat{r}(k)$ at time $t=k$, and an upper value $N_{max}$ of the window length equivalent to that of the rectangular window.

$$N\hat{}(t)=\min[1/(\beta\hat{r}(k))^2, N_{max}] \quad (C1)$$

$$\alpha(t)=(N\hat{}(k)-1)/(N\hat{}(k)+1) \quad (C2)$$

Note that a model independent of the error accuracy a was used in consideration of handling complex signals. After that, the exponent k is incremented by "1" (S013 in FIG. 2), and the processing step for output of the signals x and the subsequent arithmetic processing are repeated (see S002 and later steps in FIG. 2).

According to the signal processing device 10 that achieves the above-mentioned functions, since the window length is so adjusted that the estimated error of the correlation matrix R will be reduced, the convergence rate and estimation accuracy in estimating the correlation matrix and the correlation value as its off-diagonal element can be improved (see Equations (C1), (C2), and S012 in FIG. 2). Then, in such a high-probability condition that the correlation of plural output signals x according to a state is estimated with a high degree of precision, signal processing is performed on the plural signals, so that the state can be estimated with a high degree of precision (see Yes in S009 and S010 in FIG. 2).

Figure 3:
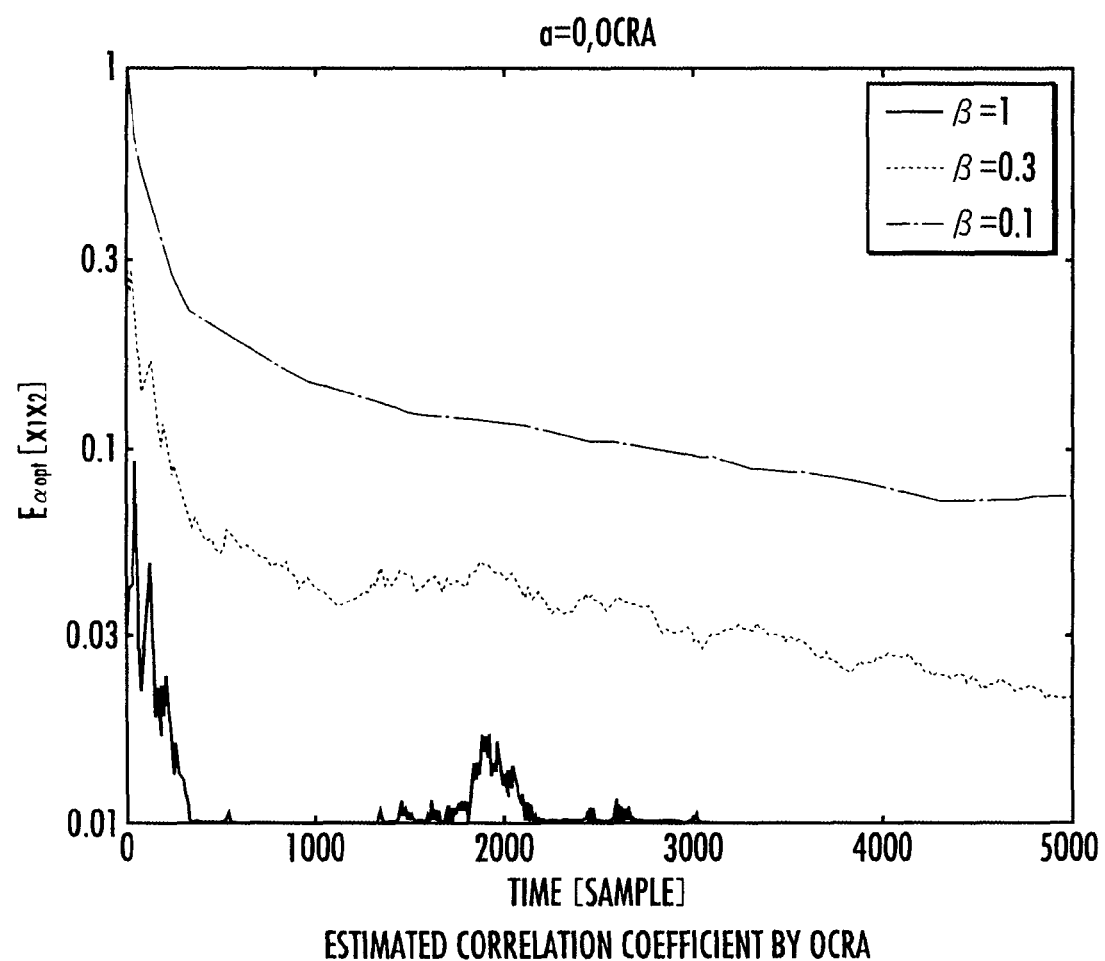
FIG. 3 is a graph for explaining estimated correlation values by an OCRA method.

The following describes the performance testing results of the signal processing device 10. FIG. 3 illustrates estimated correlation values of uncorrelated signals calculated according to the OCRA method. The abscissa represents time, the ordinate represents correlation values, and the line types represent differences in allowable error rate $\beta$. It is apparent from FIG. 3 that in case of $\beta=1$, the estimate value approaches zero very fast though the variability of estimate values is significant. In case of $\beta=0.3$, the estimation of correlation values is relatively stable, and both the convergence rate and the estimation accuracy are better than the case where the window length is fixed (see FIG. 10). In case of $\beta=0.1$, the estimate values are stable but the convergence rate is slow. Thus, it can be said that the OCRA method is an effective technique when the error acceptance rate is high.

Figure 4:
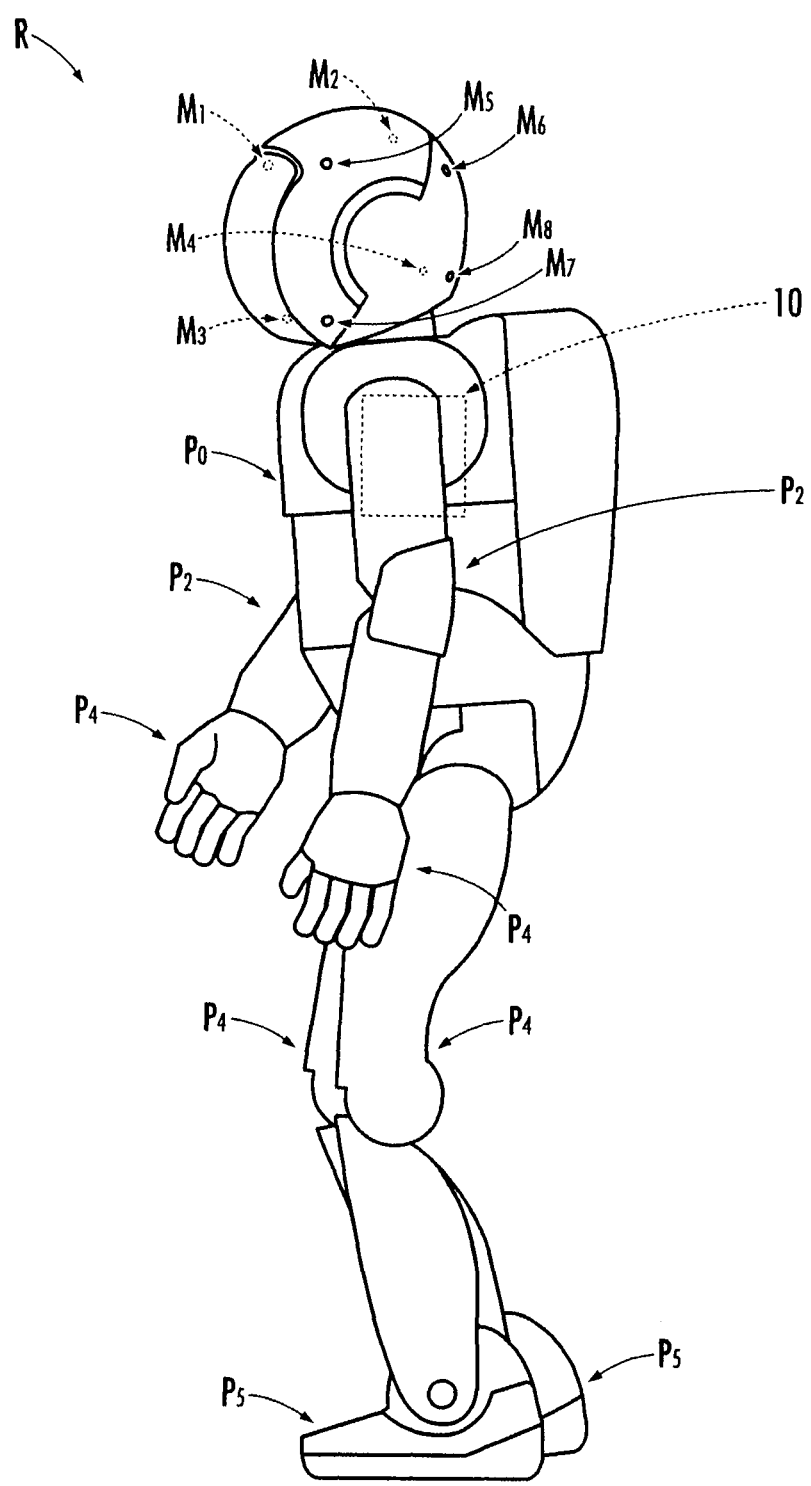
FIG. 4 is an illustration of an example of installation, into a robot, of the signal processing device of the present invention.

The following describes the performance testing results when the OCRA method is applied to BSS. Plural microphones $M_i$ (i=1, 2, ..., n) that constitute the state detection unit 11 are arranged, for example, as shown in FIG. 4 in such a manner that four microphones are arranged on each of right and left sides of a head P1 of a robot R in which the electronic control unit 10 that constitutes the signal processing device 10 is installed. In other words, microphones $M_1$ to $M_4$ are arranged in an upper front portion, an upper rear portion, a lower front portion, and a lower rear portion of the right side of the head P1, respectively. Similarly, microphones $M_5$ to $M_8$ are arranged in an upper front portion, an upper rear portion, a lower front portion, and a lower rear portion of the left side of the head P1, respectively. The robot R is a legged robot, and like a human being, it has a body P0, the head P1 provided above the body P0, right and left arms P2 provided to extend from both sides of the upper part of the body P0, hands P3 respectively coupled to the ends of the right and left arms P2, right and left legs P4 provided to extend downward from the lower part of the body P0, and feet P5 respectively coupled to the legs P4. The body P0 consists of the upper and lower parts arranged vertically to be relatively rotatable about the yaw axis. The head P1 can move relative to the body P0, such as to rotate about the yaw axis. The arms P2 have one to three rotational degrees of freedom at shoulder joints, elbow joints, and wrist joints, respectively. The hands P3 have five finger mechanisms corresponding to human thumb, index, middle, annular, and little fingers and provided to extend from each palm so that they can hold an object. The legs P4 have one to three rotational degrees of freedom at hip joints, knee joints, and ankle joints, respectively. The robot R can work properly, such as to walk on its legs, based on the sound-source separation results.

In this performance testing, a GSSAS method for adaptively adjusting the step size to the optimum value (see Nakajima et al., Technical Report of IEICE, Vol. EA2007-30, pp. 19-24, 2007) based on a GSS separation method by decorrelation with a geometric constraint (see J. M. Valin et al., Proc. IEEE/RSJ Intelligent Robot and Systems, pp. 2123-2128, 2004). The algorism of the GSSAS method is expressed by Equations (21) to (28).

$$y = W_t x \quad (21)$$

$$W_{t+1} = W_t - \mu_{LC} J_{LC}' - \mu_{ss} J_{ss}' \quad (22)$$

$$E_{ss} = R_{yy} - \text{diag}[R_{yy}] \quad (23)$$

$$J_{ss}' = 2E_{xx} W_t R_{xx} \quad (24)$$

$$\mu_{ss} = \|E_{ss}\|^2 / 2 \|J_{ss}'\|^2 \quad (25)$$

$$E_{LC} = WD - I \quad (26)$$

$$J_{LC}' = E_{LC} D^H \quad (27)$$

$$\mu_{LC} = \|E_{LC}\|^2 / 2 \|J_{LC}'\|^2 \quad (28)$$

where x is the output signals from respective microphones $M_i$, y is a separate signal (the number of sound sources N, where N<the number of microphones), $W_t$ is an unmixing matrix, and D is a transfer function matrix of direct sound components. According to GSSAS, imprompt data $(xx^H, yy^H)$ is used for the correlation matrix ($R_{xx}$, $R_{yy}$) in Equations (23) and (24). On the other hand, according to the OCRA method, correlation matrix data smoothened with the exponential window is used. Further, the case where a fixed value is used as the attenuation factor α of the window length was compared with the case where the attenuation factor α of the window length is adaptively defined by the OCRA method.

Figure 5:
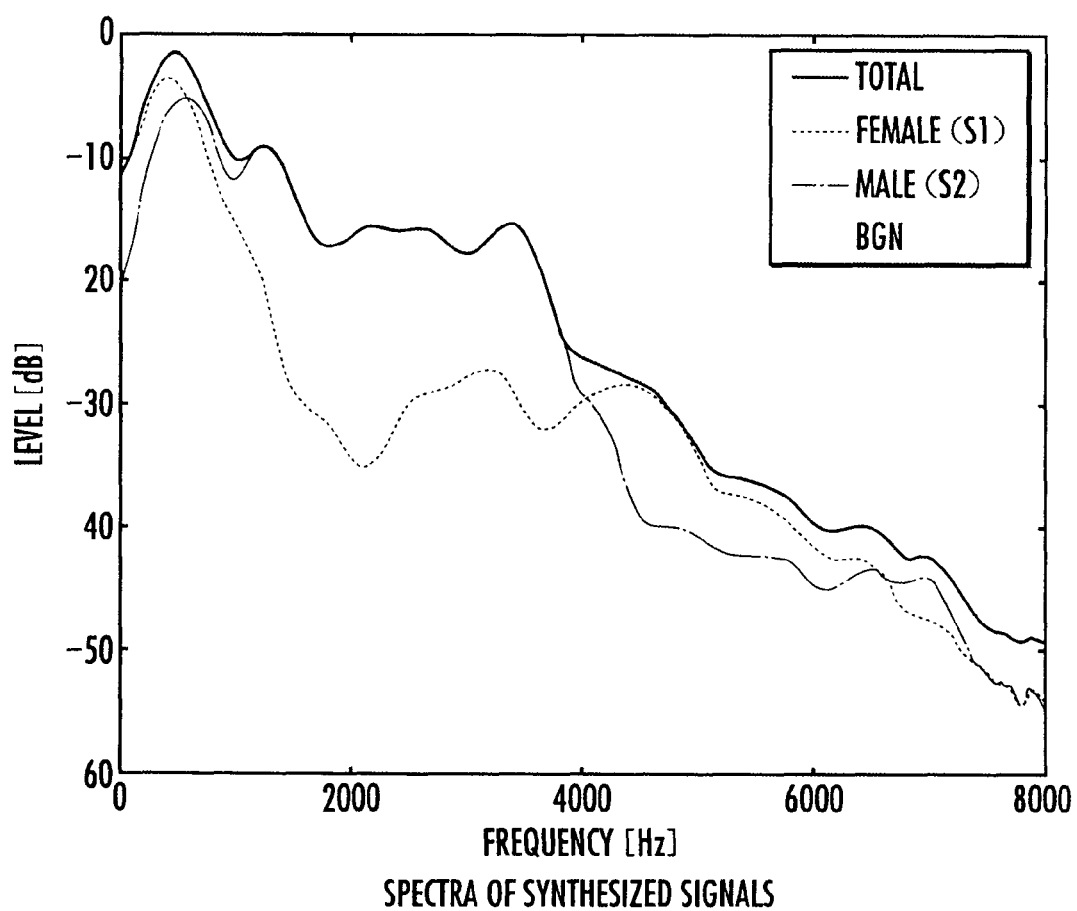
FIG. 5 is a graph illustrating frequency characteristics of each signal.

In the experiment, two clean voices were used as the sound source signals $s_j(t)$. Specifically, male voice as the first sound source signal and female voice as the second sound source signal were used. As the impulse response $h_{ji}(t)$, an actual measurement value in an experimental laboratory was employed. The experimental laboratory was 4.0 m wide, 7.0 m long, and 3.0 m high, and the reverberation time was about 0.2 s. FIG. 5 illustrates the frequency characteristics of each signal. The background noise (BGN) was −10 to −20 dB lower than the level of the sound sources. The separation results were evaluated by SNR calculated according to Equation (31) based on a separation resultant signal y, a noise signal n^ included in the signal y, and a separation resultant signal s^ for an input signal when only the target sound source exists. It means that the higher the SNR, the more accurately the sound source is separated.

$$\text{SNR[dB]} = 10 \log_{10}[(1/T)\Sigma_{t=1-T}|y(t)|^2/|n\hat{}(t)|^2],$$

$$n\hat{} = y - s\hat{} \quad (31)$$

The separation results were further evaluated based on an average correlation coefficient CC calculated in the time-frequency domain according to Equation (32). It means that the lower the average correlation coefficient CC, the more accurately the sound source is separated.

$$\text{CC[dB]} = 10 \log_{10}[(1/F)\Sigma_{f=1-F} CC_\omega(2\pi f)],$$

$$CC_\omega(\omega) \equiv |\Sigma_{t=1-T} y_1^*(t) \cdot y_2(t)|/(Y_1(\omega) Y_2(\omega)),$$

$$Y_1(\omega) \equiv (\Sigma_{t=1-T} |y_1(\omega,t)|^2)^{1/2},$$

$$Y_2(\omega) \equiv (\Sigma_{t=1-T} |y_2(\omega,t)|^2)^{1/2} \quad (32)$$

Using Julius as the speech recognition engine (see A. Lee et al., Proc. 7th European Conf. on Speech Comm. and Tech., Vol. 3, pp. 1691-1694, 2001), the correct rate of isolated word recognition for 216 ATR phonemically balanced words was evaluated as the correct rate of automatic speech recognition (ASR). The words were trained according to a clean model without reverberation and noise. For the speech features, a total of 48-dimensional mel-frequency log spectral features of a 24-dimensional mel-frequency log power value and a corresponding 24-dimensional linear regression coefficient were used. The direct sound components D of the transfer function matrix were created based on waveforms at the beginning of the impulse response.

Figure 6:
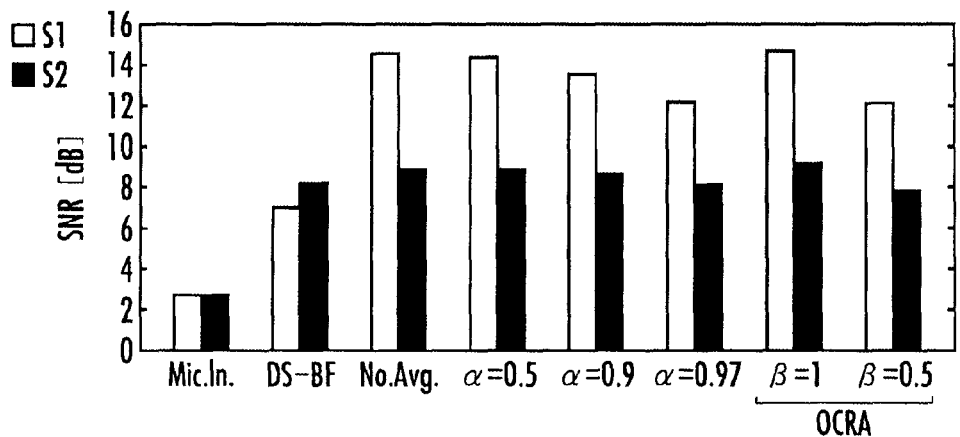
FIGS. 6(a)-6(c) are bar charts, where 6(a) shows comparison of SNR as the sound source separation results of respective methods, 6(b) shows comparison of CC as the sound source separation results of respective methods, and 6(c) shows comparison of ASR as the sound source separation results of respective methods.
Figure 6:
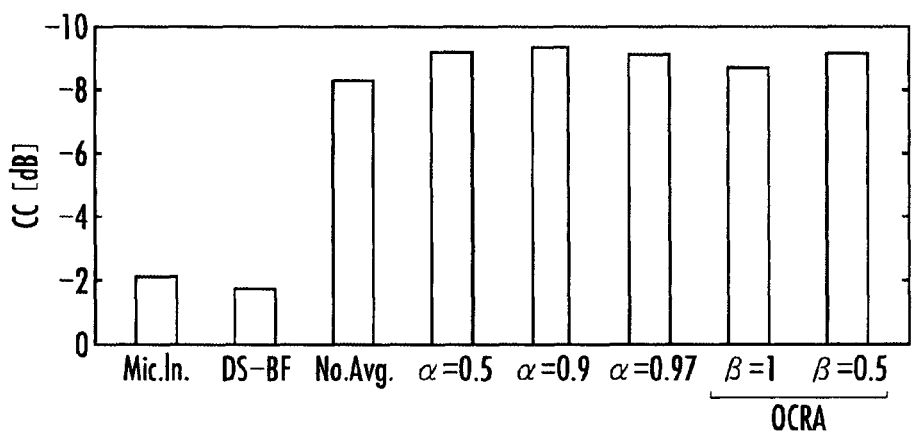
Figure 6:
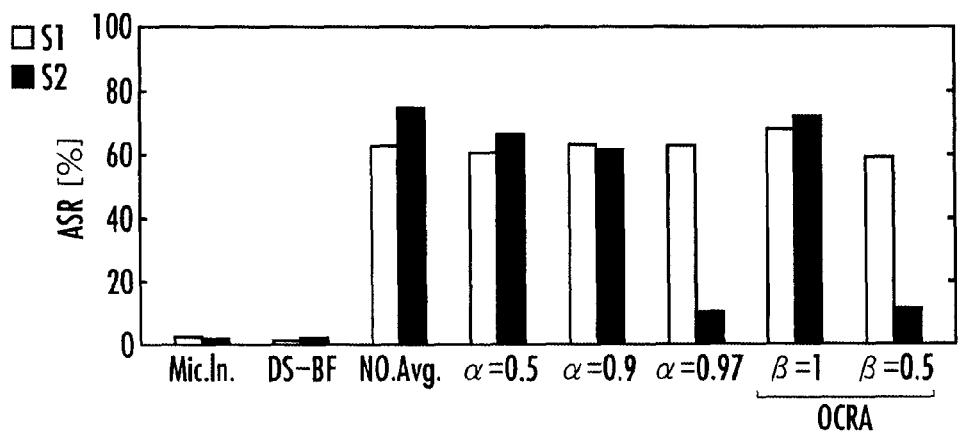

FIG. 6(a) illustrates SNR of a sound source signal separated by each technique. FIG. 6(b) illustrates CC of the sound source signal. FIG. 6(c) illustrates ASR based on the sound source signal. It is apparent from FIGS. 6(a) to 6(c) that in the case where averaging is performed on condition that the window length is fixed, CC is improved but ASR is reduced compared to the case where no averaging is performed. On the other hand, according to the OCRA method in case of β=1, the differences in SNR and CC are minute but ASR is improved compared to the case where no averaging is performed. According to the OCRA method in case of β=0.97, the separation performance is slightly lower than the case that averaging is performed on condition that window length a is fixed to 0.97. Thus, it is understood that the OCRA method is an effective technique for BSS aiming at speech recognition.

Note that, in addition to BSS, the OCRA method is also applicable to position estimation of MUSIC etc., reverberation suppression, noise suppression, estimation of the number of sound sources, etc. Further, in addition to the speech signal, the target signal can be a waveform signal such as an electroencephalographic signal or a communication signal. Further, in addition to the robot R, the signal processing device 10 can be installed in a vehicle (four-wheel vehicle), or any other machine or device in an environment in which plural sound sources exist. In addition, the number of microphones $M_i$ can be arbitrarily changed.

What is claimed is:

1. A signal processing device comprising:
   a state detection processor configured to output plural signals according to a state;
   a correlation calculation processor configured to calculate a correlation matrix of the plural signals output from the state detection processor;
   a correlation estimation processor configured to smoothen the correlation matrix calculated by the correlation calculation processor according to a window function to determine an estimated correlation matrix;

an estimated error evaluation processor configured to evaluate an estimated error based on the estimated correlation matrix determined by the correlation estimation processor; and a window length adjusting processor configured to adjust a window length as the length of the window function in such a manner to reduce the estimated error evaluated by the estimated error evaluation processor, wherein the correlation estimation processor is configured to determine the estimated correlation matrix according to an exponential window as the window function, and the window length adjusting processor is configured to adjust the window length $\alpha(t)$ according the following equations (C1) and (C2) based on an allowable error rate $\beta$, an estimated correlation value $\hat{r}(t)$ as an off-diagonal element of the estimated correlation matrix at time t, and an upper value $N_{max}$ of the window length equivalent to that of a rectangular window:

$$\hat{N}(t)=\min[1/(\beta\hat{r}(t))^2, N_{max}], \quad (C1)$$

$$\alpha(t)=(\hat{N}(t)-1)/(\hat{N}(t)+1) \quad (C2).$$

2. A signal processing device comprising:

a state detection processor configured to output plural signals according to a state;

a correlation calculation processor configured to calculate a correlation matrix of the plural signals output from the state detection processor;

a correlation estimation processor configured to smoothen the correlation matrix calculated by the correlation calculation processor according to a window function to determine an estimated correlation matrix;

an estimated error evaluation processor configured to evaluate an estimated error based on the estimated correlation matrix determined by the correlation estimation processor;

a window length adjusting processor configured to adjust a window length as the length of the window function in such a manner to reduce the estimated error evaluated by the estimated error evaluation processor; and a state estimation processor configured to estimate the state by performing signal processing on the plural output signals according to the estimated correlation matrix when the estimated error has become a predetermined value after the window length adjusting processor adjusted the window length in such a manner that the estimated error would be equal to or less than the predetermined value, wherein the correlation estimation processor is configured to determine the estimated correlation matrix according to an exponential window as the window function.

3. The signal processing device according to claim 1, further comprising a state estimation processor configured to estimate the state by performing signal processing on the plural output signals according to the estimated correlation matrix when the estimated error has become a predetermined value after the window length adjusting processor adjusted the window length in such a manner that the estimated error would be equal to or less than the predetermined value.

* * * * *